(12) United States Patent
Hassbring et al.

(10) Patent No.: US 12,541,856 B2
(45) Date of Patent: Feb. 3, 2026

(54) MASKING OF OBJECTS IN AN IMAGE STREAM

(71) Applicant: Axis AB, Lund (SE)

(72) Inventors: Ludvig Hassbring, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 230 days.

(21) Appl. No.: 18/184,317

(22) Filed: Mar. 15, 2023

(65) Prior Publication Data

US 2023/0298182 A1 Sep. 21, 2023

(30) Foreign Application Priority Data

Mar. 16, 2022 (EP) .................................. 22162529

(51) Int. Cl.
*G06K 9/00* (2022.01)
*G06T 5/80* (2024.01)
(Continued)

(52) U.S. Cl.
CPC ................ *G06T 7/12* (2017.01); *G06T 5/80* (2024.01); *G06T 7/20* (2013.01); *G06T 7/70* (2017.01);
(Continued)

(58) Field of Classification Search
CPC .... G06T 3/00; G06T 3/02; G06T 3/04; G06T 3/047; G06T 3/08; G06T 3/12; G06T 3/14; G06T 3/18; G06T 3/20; G06T 5/75; G06T 5/80; G06T 7/00; G06T 7/0012; G06T 7/10; G06T 7/11; G06T 7/12; G06T 7/174; G06T 7/194; G06T 7/20; G06T 7/30; G06T 7/70; G06T 7/97; G06T 2207/10016;
(Continued)

(56) References Cited

U.S. PATENT DOCUMENTS

| 8,509,499 B2 | 8/2013 | Ioffe et al. |
| 8,699,760 B2 * | 4/2014 | Kusama ................ H04N 23/81 |
| | | 382/118 |

(Continued)

FOREIGN PATENT DOCUMENTS

| EP | 3001676 A1 | 3/2016 |
| WO | 2021/262137 A1 | 12/2021 |

OTHER PUBLICATIONS

Extended European Search Report dated Sep. 9, 2022 for European Patent Application No. 22162529.6.

*Primary Examiner* — Eric Rush
(74) *Attorney, Agent, or Firm* — Volpe Koenig (57) ABSTRACT

A method of masking or marking an object in an image stream is provided, including: generating one or more output image streams by processing an input image stream capturing a scene, including discarding pixel information about the scene provided by pixels of the input image stream, such that the discarded pixel information about the scene is not included in any output image stream; and detecting an object in the scene using the discarded pixel information, wherein generating the one or more output image streams includes masking or marking the detected object in at least one output image stream once deciding that the object is at least partially visible within this at least one output image stream. A corresponding device, computer program and computer program product are also provided.

14 Claims, 4 Drawing Sheets

(51) Int. Cl.
*G06T 7/12* (2017.01)
*G06T 7/20* (2017.01)
*G06T 7/70* (2017.01)
*G06V 10/10* (2022.01)
*G06V 10/22* (2022.01)
*G06V 10/25* (2022.01)
*G06V 10/60* (2022.01)
*G06V 20/52* (2022.01)
*G06V 40/16* (2022.01)
*G08B 13/196* (2006.01)

(52) U.S. Cl.
CPC .............. *G06V 10/16* (2022.01); *G06V 10/22* (2022.01); *G06V 10/25* (2022.01); *G06V 10/60* (2022.01); *G06V 20/52* (2022.01); *G06V 40/161* (2022.01); *G08B 13/19686* (2013.01); *G06T 2207/20132* (2013.01); *G06T 2207/30201* (2013.01); *G06V 2201/07* (2022.01)

(58) Field of Classification Search
CPC . G06T 2207/20132; G06T 2207/30196; G06T 2207/30201; G06T 2207/30232; G06V 10/16; G06V 10/22; G06V 10/24; G06V 10/243; G06V 10/247; G06V 10/25; G06V 10/255; G06V 10/26; G06V 10/273; G06V 10/60; G06V 10/62; G06V 10/96; G06V 20/40; G06V 20/46; G06V 20/50; G06V 20/52; G06V 20/70; G06V 40/10; G06V 40/16; G06V 40/161; G06V 40/172; G06V 2201/07; G08B 13/19686

USPC ........ 382/100, 103–105, 107, 115, 117, 118, 382/128, 131, 132, 153–155, 159, 382/162–165, 173, 181, 203, 209, 217, 382/224–227, 229, 232, 239, 243, 254, 382/261, 275, 276, 282, 283, 291, 382/293–295, 298–300, 302, 305, 307, 382/308, 312, 325; 348/61, 77, 113, 135, 348/139, 140, 143–157, 161, 169–172; 345/418, 421, 427, 428, 581, 619–629, 345/632–634, 647–649, 651, 655

See application file for complete search history.

(56) References Cited

U.S. PATENT DOCUMENTS

| | | | |
|---|---|---|---|
| 9,110,365 B2* | 8/2015 | Homma | H04N 23/63 |
| 11,128,815 B2* | 9/2021 | Jeong | G06V 10/75 |
| 11,341,614 B1* | 5/2022 | Chen | G06T 7/73 |
| 2009/0046147 A1* | 2/2009 | Henson | H04N 7/181 |
| | | | 348/143 |
| 2013/0108105 A1 | 5/2013 | Yoo et al. | |
| 2014/0300765 A1* | 10/2014 | Takao | H04N 23/6842 |
| | | | 348/208.1 |
| 2015/0145992 A1 | 5/2015 | Traff | |
| 2018/0167558 A1* | 6/2018 | Hirai | H04N 23/683 |
| 2021/0034904 A1* | 2/2021 | Lee | G06T 7/11 |
| 2022/0108541 A1* | 4/2022 | Ozone | G06V 10/235 |

\* cited by examiner

MASKING OF OBJECTS IN AN IMAGE STREAM

FIELD OF INVENTION

The present disclosure relates to masking or marking of objects in an image stream. In particular, the present disclosure relates to how to improve such masking or marking when an object is only partially visible or suddenly appears in the image stream.

TECHNICAL BACKGROUND

Various object detection algorithms are available which are normally able to both identify and locate an object within an image. Identifying may include e.g., telling which class a detected object belongs to and determining whether the object should be masked or marked, while locating may include providing e.g., coordinates and overall shape of the object within the image. Information from the object detection algorithm may then be provided to an object tracking algorithm, such that the movement of a particular object can be tracked over multiple images in for example an image stream captured by a video camera (i.e., in a video stream). Knowing the position and/or movement of an object can be useful e.g., when there is a need to apply a privacy mask over the object such that an identity of the object is not readily available to a user watching the image stream.

Object detection algorithms may however fail to properly identify and locate an object if the object is for example only partially visible in the image stream. This may in particular be the case if the object is close to a boundary of the image stream, e.g., when the object has just entered into, or is just about to leave, a scene captured by the image stream. If the object detection algorithm fails to properly identify and locate such an object, it will not be able to feed information about the object to the object tracking algorithm. This may lead to a reduced performance of the object tracking algorithm for such objects, as the object tracking algorithm often needs to receive at least a few updates of information from the object detection algorithm before being able to lock-on to and start tracking an object.

As a consequence of the above, masking or marking of the object in the image stream will become more unreliable close to or at e.g., a boundary of the image stream, where objects are more likely to be partially hidden and/or suddenly enter into view. If masking is required for e.g., various privacy reasons, this may be particularly problematic as a sufficient adhering to existing privacy rules may then no longer be guaranteed.

SUMMARY

To at least partially solve the above identified problem of masking (or e.g., marking) partially hidden or suddenly appearing objects in an image stream, the present disclosure provides an improved method, an improved device, an improved computer program, as well as an improved computer program product, as all defined in the accompanying independent claims, for masking or marking an object in an image stream. Various alternative embodiments of the improved method, device, computer program and computer program product are defined in the accompanying dependent claims.

According to a first aspect of the present disclosure, a method of masking or marking an object in an image stream is provided. The method includes generating one or more output image streams by processing a first input image stream capturing at least part of a scene. The processing includes discarding pixel information about the scene provided by one or more pixels of the first input image stream, such that the discarded pixel information is not included in any of the one or more output image streams. The method further includes detecting an object in the scene by using the discarded pixel information (i.e., the pixel information not included in any of the one or more output image streams). Finally, generating the one or more output image streams includes at least temporally masking or marking the detected object in at least one of the one or more output image streams, where this masking or marking is performed after (i.e., in response to) deciding that the object is at least partially within the at least one of the one or more output image streams. The method may optionally include also outputting the generated one or more output image streams (to for example a server, a user terminal, a storage device, or similar).

As will be explained in more detail later herein, the envisaged method improves upon currently available technology (such as conventional processing chains) in that it utilizes not only the information about the scene included in the output image stream to determine whether an object of interest is present, but instead also uses information about the scene which would otherwise just be discarded without further thought as part of some processing done unrelated to detecting the object. This allows the object detection (algorithm) to better detect an object before the object enters the output image stream. By so doing, the object detection may succeed even though the object is e.g., only half within the output image stream, and the risk of e.g., failing to properly mask such an object is thereby reduced or even eliminated. This in contrast to commonly available technology, in which the discarded pixel information about the scene is thrown away before the object detection (and tracking) is performed, such that the traditional object detection (and tracking) is allowed to use only the information about the scene which also ends up in the output image stream.

The envisaged method is therefore not about discarding pixel information about the scene when processing an input image stream, but rather about detecting that such pixel information has, for whatever reason, been discarded as part of the processing of the (first) input image stream. The envisaged method may therefore include an additional step of explicitly detecting that there is such pixel information about the scene which would otherwise, if not used for the detection of the object, be discarded, and to then, after this detection, proceed with detecting the object based on this not-yet-discarded pixel information about the scene. Here, "based on" of course implies that the object may be detected using both the not-yet-discarded (but soon-to-be-discarded) pixel information and pixel information which will not be discarded and instead be part of the output image stream. This may apply e.g., when detecting an object which is currently entering the scene (as depicted in the output image stream), and where information about part of the object outside the output image stream is thus only included in the not-yet-discarded pixel information.

As used herein, a processing of the first input image stream to generate one or more output image streams may include that a particular image (or image frame) of the first input image stream is processed in order to generate a particular image (or image frame) of one of the one or more output image streams. The particular image of the first input image stream may be referred to as a particular input image, and the particular image of the output image stream in question may be referred to as a particular output image. As will be explained in more detail later herein, if using e.g., object tracking in addition to object detection, pixel information discarded when processing the particular input image may be used when masking/marking an object both in a particular output image depicting the scene at a same time instance as the particular input image, but also in one or more other output images depicting the scene at one or more later time instances than the particular input image, as the object tracking algorithm may guess a future position of an object based on information received about the object for an earlier image.

As used herein, that pixel information is "about the scene" is to be understood as that the pixels of an image (of the input image stream) recorded at a particular time instance provide information about the scene at that particular time instance. Light rays being reflected from e.g., an object in the scene is envisaged as arriving at an image sensor of a camera used to capture the scene, and when a readout of the image sensor provides values for the corresponding pixels of the image (of the input image stream), these pixels then provide information about the object and the scene in which the object is included. The pixel information provided by one or more pixels of (an image of) the input image stream may be discarded e.g., if the pixel (as part of the processing of the input image stream) gets cropped and not included in (the image of) the output stream, and/or if e.g., the value/color of the pixel is changed to a predefined value which has no correlation with its original value. The latter may e.g., be the case if a mask is applied as part of the processing of the input image stream, such that e.g., one or more pixels which initially depicted some detail of the scene is instead forced to having for example a solid black (or other) color.

As envisaged herein, the exact value/color of a pixel may however be different from the raw value found by the readout of the image sensor, due to e.g., various functions such as color-correction, or similar, first having been applied to the pixel. However, it is envisaged that such a pixel is still considered to provide pixel information about the scene, as long as the pixel is not (as described above) cropped or masked as part of the processing such that the pixel information about the scene it originally carried does not end up in any output image stream.

That an object is (at least partially) "within an output image stream" is to be understood as that the object is (at least partially) within at least one particular image of the output image stream, if it is assumed that no masking of the object first takes place.

As discussed earlier herein, "detecting an object in the scene by using the discarded pixel information" may include e.g., using the discarded pixel information as input to for example an object detection algorithm. This may correspond to e.g., providing the values of the one or more pixels providing the discarded pixel information as input to the object detection algorithm.

In one or more embodiments of the method, the one or more pixels of the first input image stream may belong to an area of the first input image stream deemed having a lower visual quality than one or more other areas of the first input image stream. Here also, an "area of the first input image stream" is envisaged as being e.g., an area of an image (frame) of the first input image stream, e.g., a set of pixels of the image of the first input image stream. The area does not necessarily need to be one, single continuous area, but may instead be split up into several subareas which do not overlap or directly adjoin each other. As will be explained later herein, such an area may for example include pixels which provide a lower resolution of the scene, and/or which are distorted for other reasons. It is, however, still assumed that these pixels contain at least some information about the scene, and that the information about the scene may thus be used to detect the object even though the information is otherwise discarded as part of the processing of the first input image stream. To the contrary, in a conventional processing chain, these pixels are often cropped and/or masked without further thought, such that these lower-quality pixels are not visible in the one or more output image streams.

In one or more embodiments of the method, the one or more pixels of the first input image stream (i.e., one or more pixels of an image of the first input image stream) deemed having a lower visual quality may originate from a peripheral area of an image sensor used to capture (the image of) the first input image stream, and/or from light having arrived at the image sensor via a peripheral section of a lens arrangement, and/or from light having arrived at an angle at the lens arrangement sufficient to cause so-called vignetting. All these are examples of causes for some pixels obtaining a lower visual quality compared with pixels e.g., originating from a center of the image sensor, and/or pixels from light which has arrived straight towards the image sensor, or similar, and may lead to e.g., a lower visual quality in form of an increased blur, a reduced sharpness, and/or a reduced overall resolution of the scene at the areas where these pixels are found. Instead of discarding/cropping and/or masking these pixels without further thought, as done in a conventional processing chain, the present disclosure envisages that these pixels may still contain pixel information about the scene that may be useful for detecting an object in the scene.

In one or more embodiments of the method, a depiction of the at least part of the scene in the first input image stream may be non-rectangular. The one or more pixels of the first input image stream may belong to pixels lying outside of a rectangular area of the non-rectangular depiction (that is, it may be possible to define a rectangular area within the non-rectangular depiction, and the one or more pixels may be pixels lying outside of this rectangular area). The non-rectangular depiction (of the at least part of the scene) may result from at least one of: a) a property of a lens arrangement through which the at least part of the scene is captured, and b) a transformation applied to the first input image stream (as e.g., part of the processing of the first input image stream to generate the one or more output image streams). Here, that the depiction of the scene is non-rectangular means that there is for example some pixels in an image of the scene which are e.g., black and not containing any information about the scene, while an outer periphery of the pixels that do depict the scene and contain information about the scene has a non-rectangular shape. It may often be desirable to crop such an image when creating an output image stream such that outer periphery of the scene as depicted in the one or more output image streams becomes rectangular. In a conventional processing chain, the pixels lying outside of the desired rectangular shape are cropped and/or masked without further thought. The present disclosure, however, envisages that these pixels may still contain information about the scene which can be useful when detecting an object in the scene.

In one or more embodiments of the method, the discarding of the pixel information about the scene may result from an encoding standard requiring that the output image stream should have a particular geometric shape, i.e., such that pixel information about the scene provided by one or more pixels lying outside the particular geometric shape are discarded, by e.g., cropping or masking these "outside pixels". The particular geometric shape is often rectangular, but it may be envisaged that there exist (or will exist) coding standards for which the particular geometric shape is non-rectangular, such as e.g., oval, circular, triangular, or similar.

In one or more embodiments of the method, the above transformation may be applied as part of one or more of: b-1) a lens distortion correction procedure; b-2) synthesizing a birds-eye view of the at least part of the scene, and b-3) one or more projections applied to stitch one or more images capturing different parts of the scene together, wherein at least one of these images are included in the first input image stream. A lens distortion correction procedure may for example be a barrel distortion correction (BDC) procedure, a pincushion distortion correction (PDC) procedure, or e.g., a tangential distortion correction (TDC) procedure, or similar. Synthesizing a birds-eye view may include using input image streams from multiple cameras, wherein no camera is actually positioned such that it has a top-down view of the scene, but wherein various perspective transformations are applied to the individual image streams such that they, combined, emulate a view as if emanating from a camera being positioned for having such a top-down view of the scene. Stitching multiple images together to e.g., create a panoramic image (stream) may include first applying one or more transformations in form of (map) projections to each image (wherein such projections may be e.g., rectilinear, cylindrical, spherical, Pannini, stereographic, or similar). The projections may for example be used to project all images to a common, e.g., spherical or cylindrical surface.

In all of the above types of transformations, an outer periphery of the scene as depicted in a transformed input image stream may no longer be rectangular, and a conventional processing chain may discard/crop and/or mask pixels lying outside of a desired rectangular area without further thought. The present disclosure, however, envisages that the pixels outside of the desired rectangular area may still provide pixel information about the scene that can be used to detect an object in the scene.

In one or more embodiments of the method, generating the output image stream may include stitching of the first input image stream with a second input image stream capturing a part of the scene not captured by the first input image stream. The one or more pixels of the first input image stream may originate from an area of the scene captured not only by the first input image stream but also by the second input image stream. As information about a part of the scene is then found in both the first and second input image streams, it may be envisaged to simply crop the pixels of the first input image stream belonging to the overlap between the first and second input image streams, without e.g., performing a blending or fading. A conventional processing chain would discard of such "overlap-pixels" of the first input image stream without further thought, while the present disclosure envisages that these pixels may contain pixel information about the scene that can be used to detect an object in the scene.

In one or more embodiments of the method, generating the output image stream may include applying an electronic image stabilization (EIS) procedure to the first input stream. The one or more pixels of the first input image stream may belong to pixels being cropped or masked by the EIS. The reason for why the EIS may crop or mask these pixels will be elaborated on later herein, but it should already now be noted that a conventional processing chain would discard of the information provided by these pixels without further thought, while the present disclosure envisages that such pixels may provide pixel information about the scene that can be used to detect an object in the scene.

In one or more embodiments of the method, the method may be performed in monitoring camera. The monitoring camera may for example form part of a monitoring camera system. The monitoring camera may be configured to capture the first input image stream. Performing the method in a monitoring camera may allow for so-called "edge-computing", wherein no further processing may be required at e.g., a server or user terminal receiving the output image stream from the monitoring camera, and wherein e.g., a delay may be reduced as computation takes place as close to the scene which is monitored as possible.

In one or more embodiments of the method, deciding that the object is at least partially within the output image stream may include using an object tracking algorithm. For example, the object may be detected using the discarded pixel information while the object is still not within the output image stream, but then followed by the object tracking algorithm as the object moves and enters within the output image stream. Thus, in the method as envisaged in the present disclosure, using the discarded pixel information may be useful even if the object is not yet within the output image stream, even if the discarded pixel information itself never ends up in any output image stream.

According to a second aspect of the present disclosure, a device for masking or marking an object in an image stream is provided. The device includes a processor (or "processing circuitry") and a memory. The memory stores instructions that, when executed by the processor, causes the device to perform the method of the first aspect. Phrased differently, the instructions are such that they (when executed by the processor) cause the device to: generate one or more output image streams by processing a first input image stream capturing at least part of a scene, wherein the processing includes discarding pixel information about the scene provided by one or more pixels of the first input image stream, such that the discarded pixel information is not included in any of the one or more output image streams; detect an object in the scene using the discarded pixel information not included in any of the one or more output image streams; and detect an object in the scene using the discarded pixel information not included in any of the one or more output image streams. To generate the one or more output image streams includes to at least temporarily mask or mark the detected object in at least one of the one or more output image streams after deciding that the object is at least partially within said at least one of the one or more output image streams. The device may optionally also be configured to output the output image stream (to e.g., a server, a user terminal, a storage device, etc., and similar).

In one or more embodiments of the device, the instructions may be such that they (when executed by the processor) cause the device to perform any embodiment of the method of the first aspect as disclosed and envisaged herein.

In one or more embodiments of the device, the device may e.g., be a monitoring camera. The monitoring camera may be configured to capture the first input image stream. The monitoring camera may for example form part of a monitoring camera system.

According to a third aspect of the present disclosure, a computer program for object detection in an image stream is provided. The computer program is configured to, when executed by e.g., a processor of a device (where the device may be e.g., a device according to the second aspect), causes the device to perform a method according to the first aspect. Phrased differently, the computer program is configured such that it, when executed by the processor of the device, causes the device to: generate one or more output image streams by processing a first input image stream capturing at least part of a scene, wherein the processing includes discarding pixel information about the scene provided by one or more pixels of the first input image stream, such that the discarded pixel information is not included in any of the one or more output image streams; detect an object in the scene using the discarded pixel information not included in any of the one or more output image streams; and detect an object in the scene using the discarded pixel information not included in any of the one or more output image streams. To generate the one or more output image streams includes to at least temporarily mask or mark the detected object in at least one of the one or more output image streams after deciding that the object is at least partially within said at least one of the one or more output image streams In one or more embodiments of the computer program, the instructions are further such that they (when executed by a processor) causes the device to perform any embodiment of a method as disclosed and envisaged herein.

According to a fourth aspect of the present disclosure, a computer program product is provided. The computer program product includes a computer readable storage medium on which a computer program according to the third aspect is stored.

Other objects and advantages of the present disclosure will be apparent from the following detailed description, the drawings and the claims. Within the scope of the present disclosure, it is envisaged that all features and advantages described with reference to e.g., the method of the first aspect are relevant for, apply to, and may be used in combination with also any feature and advantage described with reference to the device of the second aspect, the computer program of the third aspect, and/or the computer program product of the fourth aspect, and vice versa.

BRIEF DESCRIPTION OF DRAWINGS

Exemplifying embodiments will now be described below with reference to the accompanying drawings, in which.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

Herein, it is envisaged that object detection may be implemented by using one or more commonly available algorithms for object detection as already available within the various fields of computer technology, such as e.g., computer vision and/or image processing. Such algorithms may e.g., be envisaged as including both non-neural and neural approaches. A minimal requirement is however that whatever algorithm (or combinations of algorithms) being used are able to determine whether a particular object (such as a face, body, license plate, etc.) is present in an image, and in particular at what position and/or area of the image the object is located. Whether the used algorithms are e.g., feature-based, template-based and/or motion-based is not important as long as the above requirements are met. Object detection may for example be implemented using one or more neural network specifically trained for that purpose. For the purpose of the present disclosure, it is also assumed that such algorithms used in/for the object detection may struggle to properly identify and/or locate objects which are partially hidden within an image in which the object detection is assumed to be performed, e.g., when/if a person is partially obscured by a tree, vehicle or similar.

Similarly herein, object tracking is envisaged as being implementable using e.g., one or more commonly available algorithms for object tracking. Such algorithms may e.g., be bottom-up processes relying on target representation and localization, and include e.g., kernel-based tracking, contour tracking, or similar. Other envisaged algorithms for tracking may e.g., be top-down processes, including e.g., the use of filtering and data association, and implement e.g., one or more Kalman and/or particle filters. Herein, it is envisaged that such tracking algorithms may receive input from the object detection, and to then use the received input to follow an object in a scene over time (i.e., across multiple subsequent images), also if further inputs/updates from the object detection are not provided. For the purpose of the present disclosure, it is assumed that even if the object tracking is able to track/follow an object at least a couple of images/frames of an image stream after it has stopped receiving updates from the object detection, the quality of such tracking will deter with time as no new input from the detection arrives. After a while, the tracking will thus fail to properly track the object. It is also assumed that the tracking requires some time after receiving its first input/update from the detection before it is able to lock on to the object and perform successful tracking. Phrased differently, the tracking needs more than a single data point from the detection in order to arrive at a conclusion about where the object will be/move next (as it is hard or even impossible to properly extrapolate from a single data point). In what follows, the terms "object detection algorithm", "object detection", "object detection module" and "detector" are used interchangeably. The same applies also to the terms "object tracking algorithm", "object tracking", "object tracking module" and "tracker", which are used interchangeably as well.

An example of a conventional processing chain/method for masking or marking an object in an image stream will now be described in more detail with reference to FIG. 1.

Figure 1:
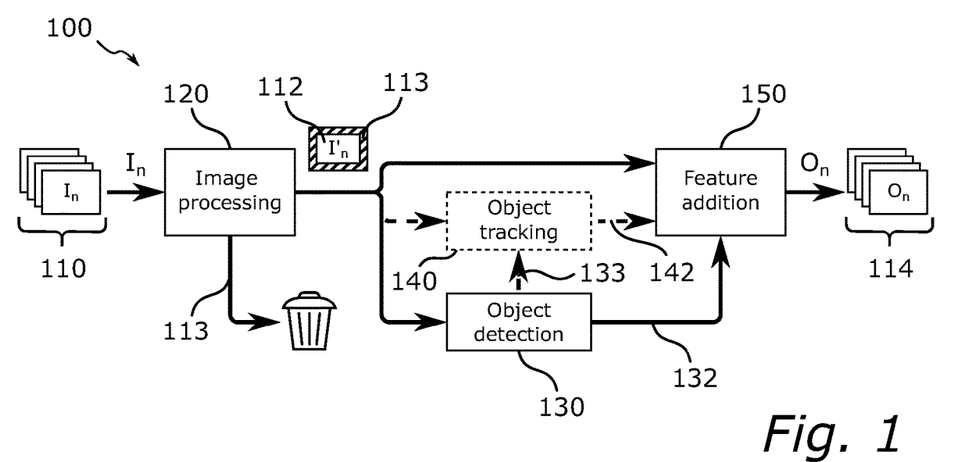
FIG. 1 shows a functional block diagram schematically illustrating a conventional processing chain/method for masking or marking an object in an image stream.

FIG. 1 shows a functional block diagram 100 which schematically illustrates (a flow of) a method 100 as found and used in already available technology. In the method 100, an input image stream 110 is received from e.g., an image sensor capturing a scene (with the help of e.g., various lens arrangements as part of for example a camera aimed at the scene). The input image stream 110 includes an input image $I_n$ (where the index n indicates that the particular input image $I_n$ was captured at an n:th time instance). The input image stream 110 is received by an image processing module 120 which performs image processing on the input image stream 110 and input image $I_n$ in order to, in the end of the processing chain 100, generate a corresponding output image $O_n$ as part of an output image stream 114.

The image processing performed in the module 120 results in an intermediate image $I'_n$. For various reasons, as will be elaborated on later herein, the image processing results in a discarding of pixel information about the scene, as provided by one or more pixels of the input image $I_n$. In the intermediate image $I'_n$, one or more pixels 113 are therefore either cropped or masked, such that the discarded pixel information about the scene provided by the one or more pixels 113 will not be included in any output image $O_n$ of the output image stream 114. As a result, the area 112 of the intermediate image $I'_n$ in which the scene is depicted may be smaller than in the original image In, due to the cropping and/or masking of the one or more pixels 113. It may of course, in other examples, be such that the image processing includes zooming/scaling of the area 112 after cropping or masking the pixels 113, such that the size of the depicted part 112 of the scene in the intermediate image $I'_n$ and/or the output image On is the same as (or even greater than) that of whole of the input image $I_n$. In any case, the area 112 of the intermediate image $I'_n$ does never provide as much pixel information about the scene as the whole of the input image $I_n$. This because, for example, even if zooming/scaling the area 112 (using e.g., up-sampling), the discarded pixel information about the scene cannot be restored.

As a consequence of the above, in the conventional method 100, only the pixel information about the scene provided by pixels in the remaining area 112 of the intermediate image In is available for any subsequent functional module in the flow of the method 100. As said before, pixel information about the scene, as originally provided by the one or more pixels 113, is thus discarded as a result of the image processing performed in the module 120. The discarding of pixel information by cropping or masking pixels is often performed early in the processing chain, in order to avoid spending computational resources on further processing or analyzing any pixels which will later be cropped or masked any way.

The intermediate image $I'_n$ is then passed on to an object detection module 130, wherein an attempt to identify and locate one or more objects in the area 112 is made. The result of the objection detection performed in the module 130 is passed on as object detection data 132 to a feature addition module 150, wherein e.g., a privacy mask is applied to a detected object if the detected object is identified as an object which is to be masked. The feature addition module 150 may also, or instead, add e.g., a visible indication of the identity and/or location of the detected object (shown as e.g., a frame surrounding the detected object, or similar), or any other type of marking, in the output image stream 114. The feature addition module 150 thus modifies the intermediate image $I'_n$ by adding thereto one or more such features, and outputs the result as the output image $O_n$. The output image $O_n$ forms part of the output image stream 114. The object detection data 132 may for example include a position of an identified object, an estimate regarding how certain the object detection module 230 is that the identified object is an object to be masked (or at least tracked), or similar.

The intermediate image may $I'_n$ optionally also be provided e.g., to an optional object tracking module 140. The object tracking module 140 may also (in addition, or instead) receive object detection data 133 from the object detection module 130, indicating e.g., an estimated position of an object detected in the intermediate image $I'_n$, and e.g., an indication that this object should be tracked by the object tracking module 140. This may help the object tracking module 140 to track the object over several images. For example, the object tracking module 140 may use object detection data 133 obtained for the intermediate image $I'_n$, but also object detection data 133 obtained for one or more previous intermediate images $I'_{m<n}$, in order to track the object over time (phrased differently, object detection data 133 obtained for an intermediate image $I'_n$ may be used to track an object such that the object can be masked in a subsequent output image $O_{k>n}$). The result of such tracking may be provided from the object tracking module 140 as object tracking data 142 to the feature addition module 150. The object tracking data 142 may for example include a position, shape, or similar of an object as estimated by the object tracking module 140, as well as e.g., an estimated uncertainty in the so determined position of the object. The feature addition module 150 may then use also such object tracking data 142 when e.g., applying one or more masks, markings or similar to one or more objects. In some other examples, it may be envisaged that the feature addition module 150 only receives the data 142 from the object tracking module 140, and not the data 132 from the object detection module 130. In such an example, the method 100 then relies solely on the object tracking to add e.g., masks, markings or similar to one or more objects in the output image On and in the output image stream 114. As mentioned earlier, when using object tracking, the data available for tracking in the intermediate image $I'_n$, may thus be used also when later outputting one or more subsequent output images $O_{k>n}$ of the output image stream 114.

However, as discussed earlier herein, the object detection module 130 may often struggle, or even often fail, to properly identify and locate an object which is e.g., only partially within the area 112 of the intermediate image $I'_n$. As a consequence, the object detection may fail to locate a particular such object, the object tracking module 140 (if used) may over time fail to track such an object if it stops to receive further object detection data 133 from the object detection module 130, and the feature addition module 150 may fail to e.g., properly mask all objects in a scene for which e.g., an identity should be protected by the privacy masking as the data 132 and/or 142 may no longer be available or sufficiently accurate.

How a method as envisaged in the present disclosure provides an improvement over the conventional method 100 will now be explained in more detail with reference also to FIGS. 2A and 2B.

Figure 2A:
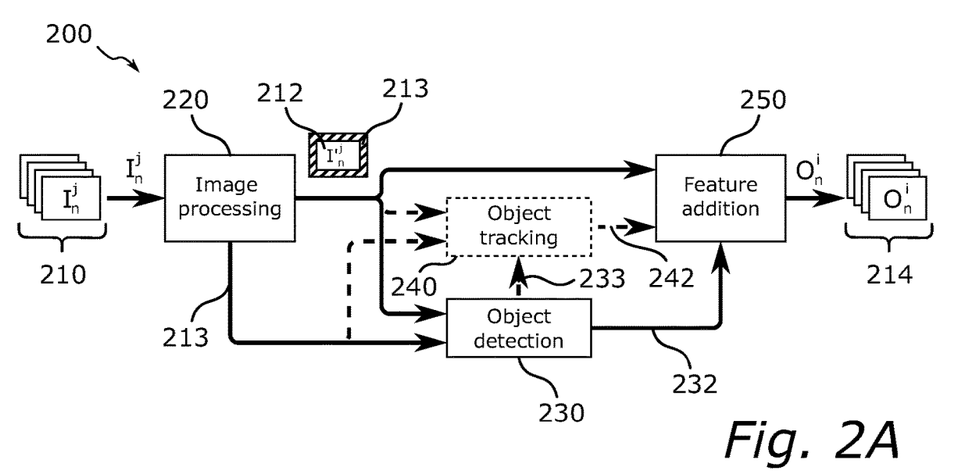
FIG. 2A shows a functional block diagram schematically illustrating various embodiments of a method of masking or marking an object in an image stream according to the present disclosure.

FIG. 2A shows a functional block diagram 200 which schematically illustrates the interaction of various functional modules used to perform various embodiments of a method 200 according to the present disclosure. FIG. 2B schematically illustrates a corresponding flowchart of such embodiments of the method 200.

In a step S201, one or more input image streams $S_{in}^j = \{ \ldots, I_{n-1}^j, j_n^j, I_{n+1}^j, \ldots \}$, 210, are received from e.g., one or more image sensors of for example one or more video cameras (such as monitoring cameras). Here, j is an index denoting the j:th such input image stream, and n is a time index such that $I_n^j$ denotes an input image of the j:th input image stream captured at an n:th time instance. An "n:th" time instance may for example correspond to a time $t_0+\Delta \times n$, where $t_0$ is some starting time and $\Delta$ a time difference between each captured image (if assuming that 0 is equal for all input image streams and between all input images of each input image stream). At least one input image $I_n^j$ is received by an image processing module 220 in order to, in the end of the processing chain and via one or more intermediate images $I'_n^j$, generate and output one or more output image streams $S_{out}^i = \{\ldots, O_{n-1}^i, O_n^i, O_{n+1}^i, \ldots\}$, 214, where $O_n^i$ indicates an output image of the i:th such output image stream depicting at least part of the scene at the n:th time instance. In what follows, to simplifying purposes only, and if not stated to the contrary, it will be assumed that there is only a single input image stream $S_{in} = \{\ldots, I_{n-1}, I_n, I_{n+1}, \ldots\}$, a single intermediate image $I'_n$, for each input image $I_n$, and a single generated output image stream $S_{out} = \{\ldots, O_{n-3 1\ 1}, O_n, O_{n+1}, \ldots\}$.

Just as in the conventional method 100 described with reference to FIG. 1, in order to generate the output image $O_n$ of the output image stream 214, the image processing performed (in a step S202) by the module 220 results, for various reasons unrelated to e.g., object detection and/or object tracking, in a discarding of pixel information about the scene provided by one or more pixels of the input image $I_n$ of some input image stream 210. The intermediate image $I'_n$ resulting from the image processing in the module 220 thus also has the remaining depiction of the scene occupying an area 212 which is smaller than that of the input image $I'_n$, as one or more pixels 213 providing the discarded pixel information about the scene have been e.g., cropped or masked. As discussed earlier, the image processing performed in the module 220 may also include scaling the area 212 such that it once again matches (or even exceeds) the area of the whole area of the input image In (which however does not regain any information about the scene lost while cropping or masking the one or more pixels 213). Thus, also in the improved method 200, the pixel information about the scene provided by the one or more pixels 213 originally found in input image $I_n$ and the input image stream 210 is not included in any corresponding output image $O_n^i$ and output image stream 214. It should be noted that herein, that an output image and input image have a same time index n means that both images represent the scene as it is/was at the same time instance, and not necessarily that the output image $O_n$ is generated at the same time as the input image $I_n$. For example, there may be some delay between capturing the input image $I_n$ and finally generating the output image $O_n$, due to e.g., a time required to complete the processing of the input image $I_n$ or similar.

As envisaged herein, when saying that the discarded pixel information about the scene is not included in any output image and output image stream 214, it is meant that processing is performed on a particular input image $I_n^j$ of a particular j:th input image stream, and that there is no output image $O_n^i$ (in any output image stream) which includes pixel information about the scene obtained from one or more masked or cropped pixels from this particular input image $I_n^j$. There may of course be such that the output image $O_n^i$ still contain this pixel information about the scene, but in such a case this information has been obtained from e.g., processing of another input image of another input image stream. For example, as will be discussed in more detail later herein, several input image streams may be combined to create a panoramic view of the scene, and some parts of the scene may thus be visible in many of these multiple input image streams if they are captured such that they overlap in space. However, if one or more pixels of a particular input image of a particular one such input image stream are cropped or masked during processing of this particular input image, the pixel information about the scene provided by these pixels is not considered as being part of the output image stream, even if other pixels in one or more other input images of one or more other input image streams happen to provide the same or similar pixel information about the scene. Phrased differently, as already used herein, the discarded pixel information about the scene provided by one or more pixels of a particular input image of a particular input image stream are, as envisaged herein, not included in any output image of any output image stream, as the one or more pixels are cropped or masked as a result of the processing of the particular input image and input image stream. In particular, as envisaged herein, the pixel information about the scene provided by a particular input image capturing part of the scene at a particular time instance is not provided in any output image of any output image stream depicting (part of) the scene as it is/was at that particular time instance.

The intermediate image $I'_n$ resulting from the processing of the input image $I_n$ is provided to an object detection module 230 which may use the remaining pixels of the area 212 and the pixel information about the scene provided by these pixels to detect (in a step S203) an object in the scene. However, in contrast to the conventional method 100 described with reference to FIG. 1, the processing chain of the improved method 200 does not just discard the pixel information about the scene provided by the one or more (cropped or masked) pixels 113 without further thought. Instead, and most importantly, in the method 200 the one or more pixels 213 and the pixel information about the scene they provide are instead also provided to the object detection module 230, such that the object detection module 230 may use also this pixel information about the scene when detecting (i.e., in the step S203) the object. As a consequence, the object detection module 230 is provided with information about the whole of the input image $I_n$ of the scene and not just the area 212 remaining after processing of the input image $I_n$. This allows the object detection module 230 to detect an object which is only partially visible within the area 212 and in the output image $O_n$ in the output image stream 214, as the object may still be completely visible (or at least visible enough to be properly identified and/or located by the object detection) in the full input image $I_n$ (i.e., a combination of the area 212 plus the one or more pixels 213). This will provide an improved, more reliable performance of the object detection, such that objects are more likely to be properly masked or marked in e.g., the output image $O_n$ in the output image stream 214.

If using object tracking, detecting the object using the content of a whole of the input image $I_n$ can also help to e.g., track the object in one or more output images $O_{k>n}$ (not shown) subsequent to the output image $O_n$ in the output image stream 214. For example, in some embodiments, it is envisaged that the object detection module 230, when analyzing a whole of the input image $I_n$, identifies an object which is visible within the one or more pixels 213 but not visible within the area 212. The object will thus not be visible in the output image $O_n$ and thus not neither masked nor marked in this output image $O_n$. However, the object detection data 233 is still sent to the object tracking module 240 such that this module may, if not having already started, start to track the object in the scene before the object becomes visible in e.g., the area 212 of a subsequent image $I'_{k>n}$. When the object becomes visible in the area 212, the object detection module 240 will therefore already be tracking the object, and the object can be properly masked in the subsequent output image $O_{k>m}$ as soon as it enters the area 212. As illustrated in FIG. 2A, the one or more pixels 213 may of course also optionally be provided to the object tracking module 240 and not only to the object detection module 230, which may be useful if the object tracking module 240 is such that it uses pixel information to track an object and not e.g., only updates about the position of the object provided by the object detection module 230.

It is also envisaged that in some embodiments, not necessarily all discarded pixels need to be used for detection and/or tracking of objects. For example, some discarded pixels may belong to a part of the scene (as captured in an input image) that is statistically known not to contain objects of interest. It may then be decided not to submit the pixel information about the scene provided by such pixels e.g., to the object detection module, even if the corresponding pixels are masked and/or cropped. Such a part of the scene may e.g., correspond to a sky, or any other area of the scene, in which objects of interest are not likely to appear (if the objects are e.g., persons, cars, or similar). In other situations, the opposite may of course also be true, and an area in which objects are not likely to appear may instead be e.g., a street, field, or similar (if the objects of interest are e.g., planes, drones, or other flying objects). By not providing such pixel information to e.g., the object detection algorithm, a spending of object detection resources may be avoided in areas where they are known (or at least usually are known) not to be needed. Whether all or only some of the discarded pixels (and the pixel information about the scene they provide) are to be used for detection and/or tracking may be predetermined by e.g., manually indicating one or more areas of the scene as "non-interesting" or "interesting", or may e.g., be determined using collected historical data showing areas where objects of interest were and were not previously detected or tracked. Other types of scene or image analytics, etc., may of course also be used to determine which areas of the scene are non-interesting and which are interesting.

The intermediate image $I'_n$ (in which the area 212 represents how the scene will be depicted in the output image $O_n$) is provided to a feature addition module 250, together with object detection data 232 from the object detection module 230 and (if included) object tracking data 242 from an object tracking module 240. The feature addition module 250 can then add (in a step S205) one or more (privacy) masks or markings to (or on top of) the intermediate image $I'_n$ in order to mask (or mark) one or more detected and/or tracked objects before outputting the output image $O_n$ as part of the output image stream 214. Just as in the conventional method 100 described with reference to FIG. 1, the object tracking module 240 may in some embodiments of the method 200 be optional and, if used/available, may be provided with object detection data 233 from the object detection module 230 to help the object tracking module 240 achieving proper tracking of an object. Likewise, in some other embodiments, if the object tracking module 240 is included, the feature addition module 250 may then only rely on the object tracking data 242 and not on the object detection data 232 to know where to add masks or markings (in case which it may be optional to send the object detection data 232 to the feature addition module 250). The masking or marking of an object in the output image $O_n$ and output image stream 214 may e.g., be temporarily, meaning that the applied masks or markings may be removed once e.g., the object is no longer in the scene as depicted in the output image $O_n$ and output image stream 214, or e.g., if the object becomes hidden behind another object in the scene (such that it can no longer be detected and/or tracked, or such that e.g., a masking is no longer necessary). In other envisaged situations, a masking of an object may e.g., be removed if the object changes its orientation within the scene such that it would no longer be possible to deduce an identity of the object even without a mask. For example, a masking of a person may be required if the person is oriented such that its face is aimed towards the camera, while a masking of the person may no longer be required if the person changes its orientation such that its face is aimed away from the camera, or similar. The masking or marking of the object in the output image $O_n$ and the output image stream may be made only after first deciding (in a step S204) that the object is at least partially within the output image $O_n$ and the output image stream 214. Such a decision may be taken e.g., by the object detection module 230 and/or the object tracking module 240 and then communicated to the feature addition module 250. It is envisaged also that such a decision may be taken by the feature addition module 250 itself, or by any other module which has sufficient information to determine whether an object is or will be at least partially within the output image $O_n$ and the output image stream 214.

As described earlier herein, deciding whether the object is "within the scene" or not includes taking into account whether the position of the object in the scene is such that it would be at least partially visible in the output image $O_n$ and output image stream 214 in case no masking was performed.

In general, it should be noted that although the object detection and object tracking are being illustrated in FIG. 2A as performed by different entities/modules, it may of course also be such that both functions are provided by a combined object detection and tracking function, and implemented in e.g., a same such a combined object detection and tracking module. The situation may vary depending on which exact algorithms that are used for object detection and tracking, as some algorithms may e.g., track an object based on own observations of the objects position in some images, or similar. Overall, it may of course also be the case that two, three, or even all of the modules 220, 230, 240 and 250 shown in FIG. 2A are implemented as a single module, or at least as a fewer number of modules than shown in FIG. 2A. This because the various modules do not necessarily represent physical modules, but may be implemented also using only software, or e.g., as a combination of physical hardware and software, as will be described later herein.

Figure 2B:
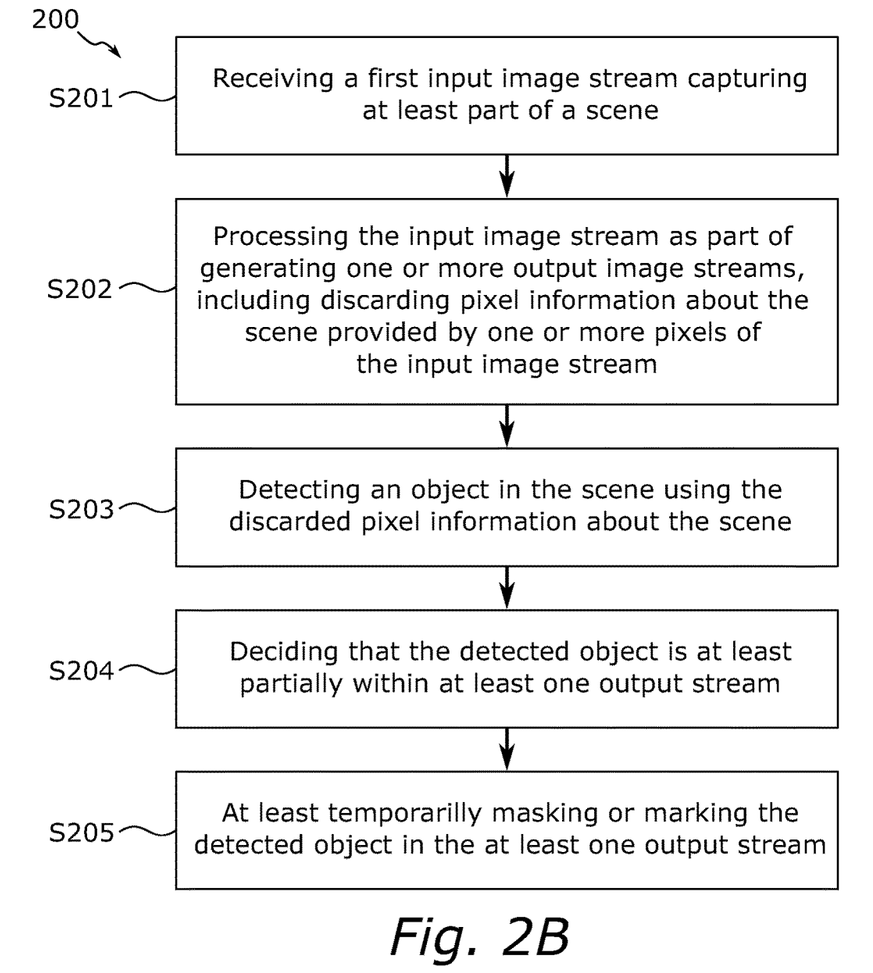
FIG. 2B schematically illustrates a flowchart of one or more embodiments of a method according to the present disclosure.

In summary of FIGS. 2A and 2B, and the improved method 200 as envisaged herein, it should be noted that by using pixel information about the scene provided by one or more pixels 213 which would otherwise be discarded (e.g., by cropping or masking the one or more pixels 213) for other reasons, the object detection (and/or tracking) can gain information about an object already when the object is at least within the one or more pixels 213 (i.e., before the object at least partially enters the part of the scene depicted in the output image $O_n$ and output image stream 214). This means that when (or if) the object later enters the visible area 212 of a subsequent output image $O_{k>n}$, the position of the object to be masked (or marked) can already be known. This in contrast to commonly available, wherein the pixel information about the scene provided by the one or more pixels 113 is never provided to any object detection and/or tracking functionality, and wherein such object detection and/or tracking thus has no knowledge about any information about an object that was included within the one or more pixels 113. Consequently, while the commonly available methods face a higher risk of failing to e.g., properly identify, locate, track and mask/mark an object suddenly appearing within an output image of an output image stream, the envisaged method 200 according to the present disclosure can perform better as it enables the use of the discarded pixel information about the scene even if this pixel information is still not included in any output image and output image stream.

Various examples of envisaged situations wherein the image processing module 220 may select to discard (i.e., crop or mask) certain pixels from an input image and input image stream will now be explained in more detail with reference to FIGS. 3A-3E.

Figure 3A:
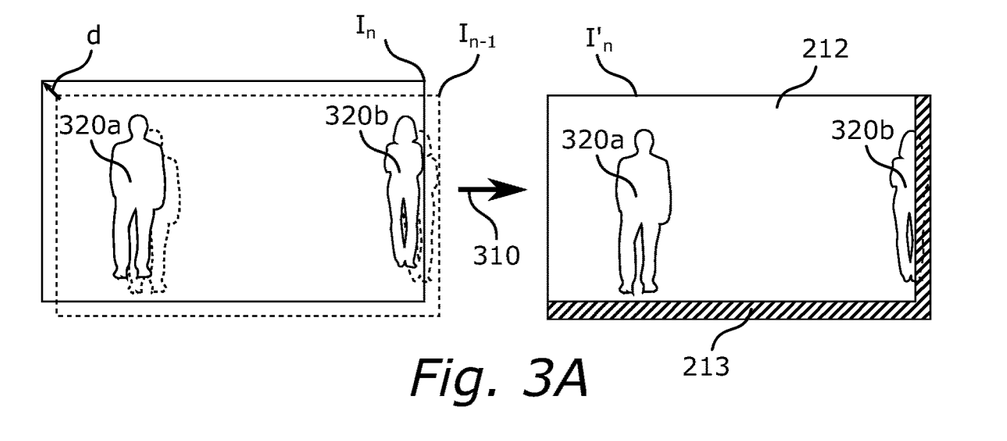
FIGS. 3A-3E schematically illustrate various example situations resulting in a discarding of pixel information about the scene, as envisaged in one or more embodiments of a method according to the present disclosure is also applicable, and FIGS. 4A and 4B schematically illustrates one or more embodiments of a device according to the present disclosure.

FIG. 3A schematically illustrates a situation wherein electronic image stabilization (EIS) results in a cropping of certain pixels. An input image $I_n$ includes two objects in form of person 320a and person 320b. A previous input image $I_{n-1}$ is of the same scene, and it can be seen from FIG. 3A that the camera has moved between capturing the images $I_{n-1}$ and $I_n$. The movement is assumed to be due to shaking of the camera. As indicated in FIG. 3A, the detected movement corresponds to a translation vector d. Using image processing 310, the shaking of the camera can be corrected for by simply applying an inverse translation –d, such that the persons 320a and 320b in the image $I_n$ will overlap themselves in the previous image $I_{n-1}$ (as indicated by the dashed outlines). In order for the size of the scene as depicted in an output image to remain constant, such an inverse translation will however result in an intermediate image $I'_n$, wherein a plurality of pixels 213 of the input image $I_n$ have been cropped in order to keep the persons 320a and 320b stationary in the scene, and wherein the remaining visible area 212 of the intermediate image $I'_n$ is thus smaller than that of the input image $I_n$.

In commonly available methods of masking or marking an object in an image stream, an object detection algorithm would be provided pixel information about the scene provided only by the pixels in the area 212 of the intermediate image $I'_n$. As person 320a is still fully within the area 212, the object detection algorithm would have no issues with locating the person 320a and identifying the person 320a as an object to be e.g., masked or marked. However, the same algorithm would likely have a hard time to properly identify and locate person 320b as person 320b is now only partially visible in the area 212. With the method as envisaged herein, this would not be an issue as the object detection algorithm would also be provided pixel information about the scene as provided by the discarded pixels 213. As the person 320b is fully visible in the joint set of the pixels of the area 212 and the pixels 213, the object detection algorithm would thus be successful in locating and identifying also the person 320b.

Figure 3B:
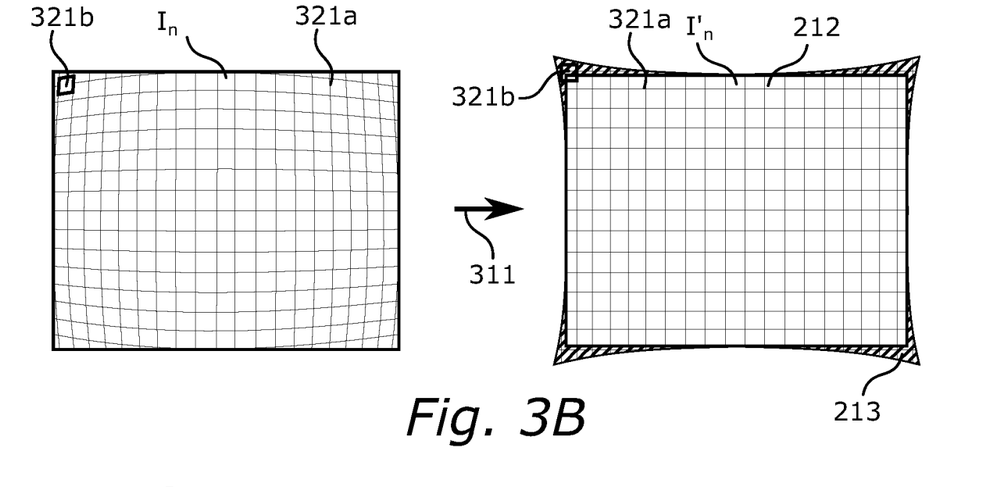

FIG. 3B schematically illustrates a situation wherein a lens arrangement used to capture the input image stream is such that the input image $I_n$ suffers from so-called barrel distortion. In reality, the depicted scene has a rectangular grid 321a (e.g., a brick wall, or similar) in the background and includes an object 321b in front which is supposed to be masked or marked. Due to the barrel distortion caused by the lens arrangement, the lines of the grid 321a are no longer straight in the input image $I_n$. To correct for such barrel distortion, there exist various algorithms that can be used as part of an image processing 311 of the input image $I_n$ to create the intermediate image $I'_n$ in which the lines of the grid 321a are once again straight. A side effect of such algorithms is however that they, while straightening the lines of the grid 321a also deforms a shape of an outer periphery of the depicted scene. For example, as illustrated in FIG. 3B, the input image $I_n$ depicts the scene as having a rectangular outer periphery, but with the lines of the grid 321a not being straight everywhere. After the image processing 311, the lines of the grid 321a are straight again, but the outer periphery of the scene as depicted has now warped such that it appears as if the corners of the previous rectangular outer periphery of the scene have now been pulled radially outwards. It is often not desirable to present such a non-rectangular depiction of the scene to a user, and the image processing 311 therefore also includes a step wherein all pixels which after the barrel distortion correction end up lying outside of the rectangular area 212 are cropped (or masked). In FIG. 3B, these cropped or masked pixels are the pixels 213. Consequently, as a result of a transformation applied to the input image $I_n$ due to barrel distortion correction and subsequent cropping/masking of one or more pixels of the input image $I_n$, the processing 311 results in pixel information about the scene provided by the pixels 213 being discarded, and not included in an output image $O_n$ generated based on the intermediate image $I'_n$.

As can also be seen from FIG. 3B. the object 321b is fully within the scene as depicted in the input image $I_n$, but ends up being only partially within the rectangular area 212 of the intermediate image $I'_n$. Consequently, an object detection algorithm being provided with pixel information about the scene provided by the pixels of the area 212 only will thus, as in the conventional methods, likely fail to properly identify and/or locate the object 321b, and the object 321b will most likely not be properly masked or marked in the output image $O_n$ and output image stream. However, in the improved method 200 as envisaged herein, the object detection algorithm is provided also the pixel information about the scene provided by the pixels 213, and will thus have a greater chance of properly identifying and locating the object 321b as the object 321 b is fully within the joint set of the pixels in the area 212 and the pixels 213. As envisaged herein, other types of distortion (such as pin-cushion distortion, tangential distortion, or similar) may also result in there being a need to transform the input image $I_n$ in order to correct for such distortions, and the algorithms used for correction may result in the outer periphery of the scene as depicted after the correction being non-rectangular, and that one or more pixels 213 thus ends up being discarded (i.e., cropped or masked) in the intermediate image $I'_n$ due to being outside a desired rectangular area 212. The envisaged method as described herein applies equally well to such alternative situations.

Figure 3C:
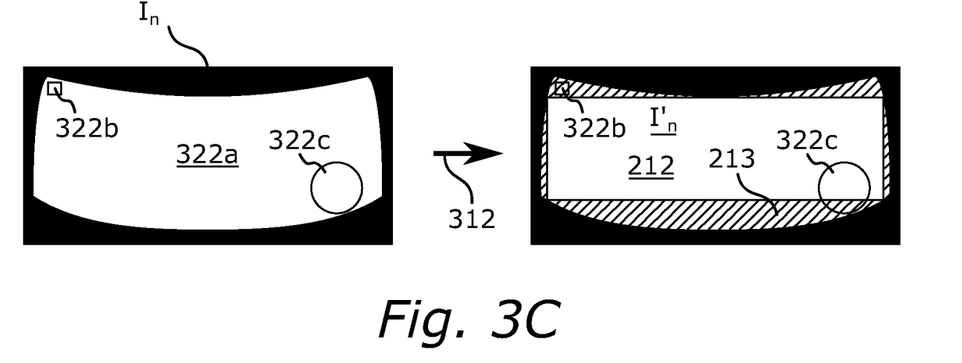

FIG. 3C schematically illustrates another situation in which the pixel information provided by the one or more pixels of the input image stream ends up being discarded due to a transformation applied to the first input image stream. Here, it is envisaged that the input image stream is formed from image data recorded by several cameras aimed in different directions, and that the image $I_n$ is thus a panoramic view of the scene created by stitching the image data from the several cameras as part of an earlier part of the processing. Such earlier part of the processing image stream has included applying various transformations in terms of various (map) perspective projections, e.g., to project the images from the several cameras onto a common, e.g., cylindrical or spherical surface before stitching these projected images together to form the input image $I_n$. As a result of such perspective projections, an outer periphery of the scene 322a as depicted in the input image $I_n$ is non-rectangular.

The scene also includes an object 322b and an object 322c, which are both within the scene 322a as depicted in the input image $I_n$. However, it is undesirable to present such a non-rectangular depiction of the scene, and a further part 312 of the processing of the input image stream thus includes cropping (or at least masking) all pixels 213 of the input image In lying outside of the rectangular area 212 in the intermediate image I'$_n$ resulting from such processing. Consequently, the object 322b will end up being fully outside the area 212, while the object 322c is only partially within the area 212. As described earlier, a conventional method wherein an object detection algorithm is only provided pixel information about the scene provided by the pixels within the area 212 will fail to identify and locate the object 322b, and will also most likely fail or at least struggle to properly identify and locate the object 322c. Proper masking or marking of the object 322c in the output image O$_n$ and the output image stream will thus likely fail, and the conventional process will also not be ready to directly mask or mark the object 322b if (or when) it partially enters the area 212 in a subsequent output image of the output image stream as the tracker (if used) has then not been provided any previous position(s) of the object 322b. With the improved method, the object detection algorithm is provided also the pixel information about the scene provided by the one or more pixels 213, and may thus manage to locate and identify the object 322b even though it is outside the area 212, and also be helped to better locate and identify the object 322c even though this object is only partially within the area 212 that will constitute the contents of the output image O$_n$. Also, if using tracking, the position of the object 322b can be provided to the object tracking algorithm as soon as the object is detected in the pixels 213, and masking or marking of the object 322b in a subsequent output image of the output image stream may thus be performed as soon as the object 322b becomes at least partially visible in the area 212.

Figure 3D:
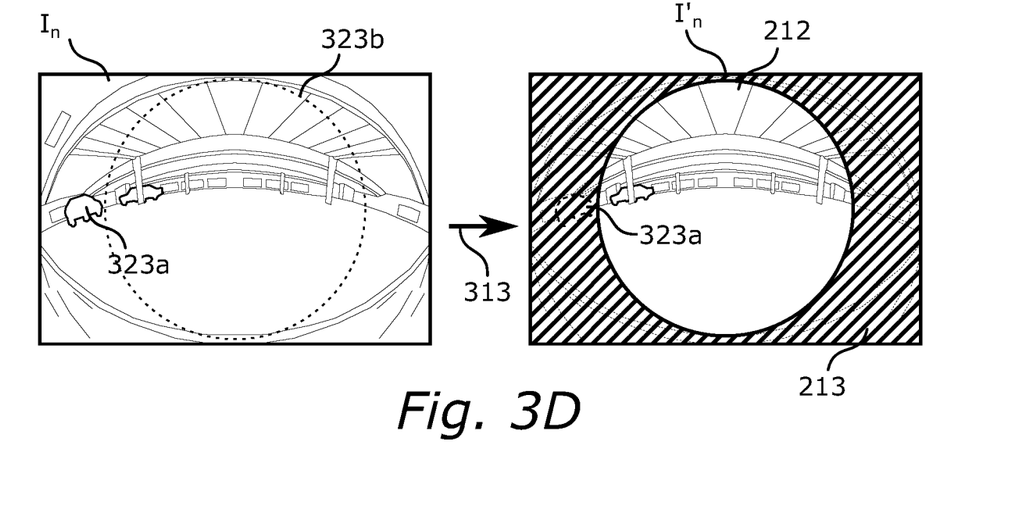

FIG. 3D schematically illustrates a situation in which how a path of the light travelling through a lens arrangement before arriving at an image sensor, and in which how the light hits the image sensor, may cause one or more pixels of the input image I$_n$ to be deemed as having a lower visual quality than other pixels in the input image I$_n$ and the input image stream. The input image I$_n$ and input image stream is here captured using a fish-eye lens, e.g., a lens which captures light from a plurality of directions and provides a larger field-of-view compared to more traditional lenses with longer focal lengths, such that a larger part of a scene can be captured in a single image. The scene is of a parking garage, and includes a vehicle 323a which is moving towards the center of the scene as depicted in the input image I$_n$. However, due to the properties of such a lens arrangement, light emanating from outside of a center region 323b of the scene has passed the lens arrangement at a periphery of the lens arrangement, and in particular at a greater angle compared with light emanating from within the center region 323b of the scene. This may result in a lower resolution of the scene being recorded at the parts of the image sensor where this (peripheral) light hits the image sensor, most usually at one or more peripheral areas of the image sensor. This may also result in fewer photons hitting these areas of the sensor, which may result in so-called vignetting where the scene appears darker and darker the further away from the center of the scene one looks in the input image I$_n$. In order to avoid presenting such lower quality details to a user watching the output image stream, pixels outside of the circular region 323b may be deemed as being of lower visible quality than pixels belonging to one or more other areas of the input image I$_n$ and the input image stream (such as pixels within the circular region/area 323b). As part of a processing 313 of the input image I$_n$ and input image stream, the one or more pixels 213 outside of the area 212 may thus be either cropped or at least masked in the resulting intermediate image I'$_n$ which forms the basis for the output image O$_n$ and output image stream, and the pixel information about the scene provided by the pixels 213 is thus discarded and not included in any output image and output image stream. Consequently, as the car 323a is outside the area 212 of the intermediate image I'$_n$, the conventional methods will not be able to detect the car 323a, and when (or if) the car 323a later enters the area 212 of a subsequent intermediate image I'$_{k>n}$ and output image, the object tracking algorithm (if used) will not be ready and masking of the car 323a will thus fail when (or if) the car first (partially) enters into the area 212. For the envisaged improved method 200 as described herein, this will not be a problem as the object detection algorithm will be provided also the discarded information about the scene provided by the one or more pixels 213, and will thus be able to inform the object tracking algorithm such that it is ready to provide the position of the car 323a as soon as the car 323a becomes at least partially visible within the area 212 and within an output image of the output image stream, and the car 323a can thus be properly masked or marked in the output image stream.

Figure 3E:
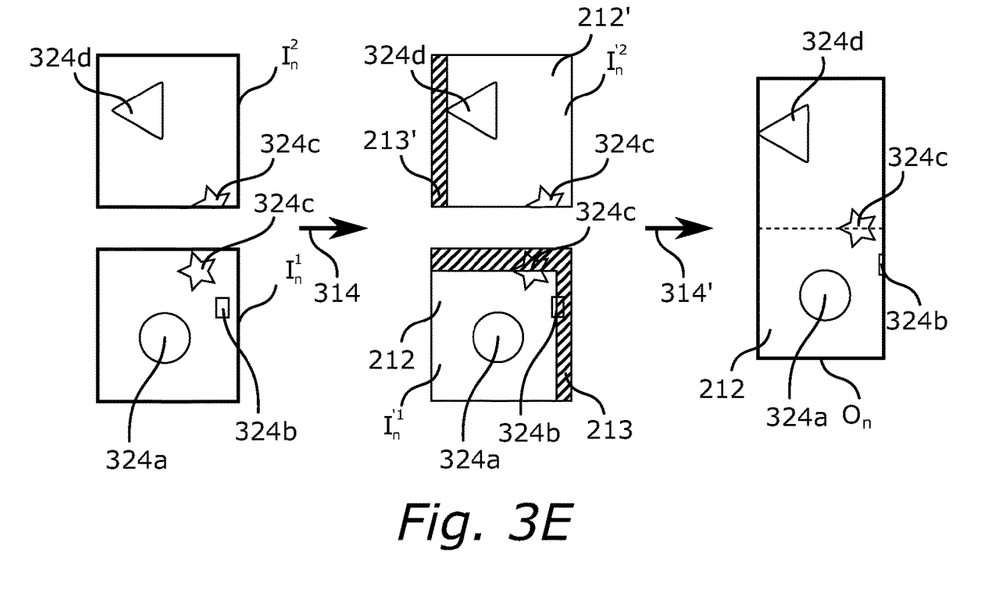

FIG. 3E schematically illustrates a situation where discarding of pixel information results from a stitching of the input image stream with another input image stream. Here, the input image I$_n^1$ of a first input image stream S$_{in}^1$ captures part of a scene including objects 324a, 324b and 324c. Another input image I$_n^2$ a second input image stream S$_{in}^2$ captures another part of the scene (i.e., including parts of the scene not captured by the first input image stream), and includes the object 324c and another object 324d. As part of a processing 314 of the input images I$_n^1$ and I$_n^2$, an overlap between the two input images I$_n^1$ and I$_n^2$ is identified (e.g., by finding out which objects of the scene that are included in both of the input images I$_n^1$ and In, e.g., the object 324c, and how the orientation and sizes of these common objects changes between the input images I$_n^1$ and I$_n^2$. It is envisaged that identifying the overlap may be performed using any suitable already available technology for stitching multiple images together to form e.g., a panoramic image of a scene.

As part of the part 314 of the processing, it is decided that pixels 213 outside of an area 212 of the resulting intermediate image I'$_n^1$, as well as pixels 213' outside of an area 212' of the also resulting intermediate image I'$_n^2$, are to be cropped and not included in a resulting output image O$_n$. Consequently, pixel information about the scene provided at least by the one or more pixels 213 of the first input image I$_n^1$ will thus not be included in any output image O$_n$ of any output image stream. Phrased differently, the one or more pixels 213 of the first input image I$_n^1$ and the first input image stream originates (at least partially) from an area of the scene which is captured also by the second input image I$_n^2$ and the second input image stream, where this area in the particular situation illustrated in FIG. 3E is the area of the object 324c.

As a result, in the output image O$_n$ of the output image stream resulting from adjoining the two intermediate images I'$_n^1$ and I'$_n^2$, the conventional method may have a hard time to properly masking e.g., the objects 324b and 324c, as the object 324b is only partially visible in the area 212, and as the object 324c was only partially visible within the intermediate image and as the pixel information about the scene provided in the pixels 213 of the first input image I$_n^1$ is discarded and not available to the object detection algorithm. However, in the improved method as envisaged herein, this is not an issue as the discarded pixel information about the scene provided by the pixels 213 is still provided to the object detection algorithm, and all objects 324a-d can thus properly be masked or marked in the output image stream as already described several times earlier herein.

FIGS. 3A through 3E thus serve to schematically illustrates examples of situations wherein pixel information about a scene is discarded during processing of an input image stream in order to generate one or more output image streams, such that this pixel information (as provided by pixels in e.g., a particular input image of a particular input image stream) is not included in any output image or output image stream thus generated. There may of course be other situations than those described with reference to FIGS. 3A through 3E in which pixels are cropped or masked as part of processing of a particular input image, while this cropping or masking is for other reasons than object detection and/or tracking, and where the pixel information about the scene thus discarded is used by the object detection algorithm as envisaged herein, and as stated and used in e.g., the accompanying claims. An improved method as envisaged herein is thus envisaged as being able to use whatever pixel information about the scene that is otherwise discarded when processing an input image and input image stream to generate one or more output images and output image streams. This independent of for which exact reason(s) the pixels of the input image stream that provided this discarded pixel information were e.g., cropped or masked during the processing, as long as the discarded pixel information about the scene is not included in any output images of any output image streams generated by processing the input image and input image stream. This allows the method to make use of also that pixel information when detecting and masking one or more objects in the output image stream. In some embodiments of the method, the method may specifically require that the pixel information about the scene is discarded due to one or more (or even all) of the situations as described in FIGS. 3A through 3E. In other embodiments of the method, the method may specifically require that the pixel information about the scene is discarded due to e.g., any combination of any two of the situations as described in FIGS. 3A through 3E, any combination of any three of these situations, any combination of any four of these situations, or a combination of all five of these situations. The exact reason(s) for discarding the pixel information about the scene is thus envisaged as being selected from a single list containing all possible situations described herein (e.g., with reference to FIGS. 3A through 3E), and also containing all possible combinations of two or more of such situations.

To be particularly clear, it should be noted that commonly available methods may include situations in which an image stream as received from a camera is first somehow processed to generate a processed image stream, and wherein this already processed image stream is then used to generate and output a first output image stream. In particular, commonly available methods may include to use this already processed image stream to, in addition to the first output image stream, generate also an additional second output image stream, and where the generation of this second output image stream may include cropping or masking of one or more pixels of the already processed image stream.

For example, in such a "conventional situation", an input image stream from a camera may be received and processed to generate e.g., a first output image stream showing an overview of a scene. The camera may be e.g., a fish-eye camera providing a large field-of-view, or e.g., a birds-eye camera having a top-down view of the scene. For an operator watching the overview of the scene, it may be desirable to be able to e.g., digitally zoom-in on the scene if something important appears to be present in a particular area of the overview of the scene. To perform such a digital zoom-in, the particular area of the scene may first be defined (e.g., by clicking or otherwise marking the area of interest in the first output image stream, and all corresponding pixels outside of this area of the first output image stream may then be cropped, and the remaining pixels may be up-sampled, as part of generating an additional second output image stream showing the thus digitally zoomed-in, detail view of the scene. There are thus two output image streams generated based on the single input image stream, and the processing includes cropping pixels from the first output image stream to generate at least the second output stream.

Most importantly, however, it is to be noted that in this "conventional situation", the cropping of the pixels when generating the second output image stream does not correspond to the discarding of pixel information about the scene as described herein, and as used in the accompanying claims. This because in the conventional situation, the cropped pixels are still present in the overview of the scene, and there is thus no discarding of pixel information about the scene provided by one or more pixels of the input image stream such that this "discarded" pixel information is not included in any output image stream.

If using the terminology of the present disclosure when describing the conventional situation, a discarding of pixel information about the scene may instead occur if, for example, one or more pixels as registered by an image sensor are deemed being of lower visual quality (due to e.g., the use of a fish-eye lens), and in that the raw image stream from the image sensor is first processed by e.g., cropping or masking such pixels being deemed having the lower visual quality, and that the result thereof is provided as the input image stream used to generate the two output image streams. The "input image stream" as used in the present disclosure and in particular in the accompanying claims is here the image stream before the low-quality pixels are masked or cropped, and the discarded pixel information about the scene is the information about the scene that were provided by these cropped or masked pixels.

In the conventional situation, this discarded information about the scene is not provided when generating any of the two output image streams, and is thus not used for e.g., detecting any object in the overview and/or to mask an object in one or both of the overview (first) or detailed (second) output image streams, and the conventional situation thus suffers from the disadvantages described herein if an object happens to be at least partially within the low-quality pixels. Phrased differently, and with reference to FIG. 1, any detection of an object in the conventional situation takes placed based only on pixel information about the scene provided by the pixels within the area 112 of the intermediate image I'$_n$, and not based on pixel information about the scene provided by the one or more pixels 113.

A (privacy) mask as envisaged herein may e.g., have a solid/opaque color, be semi-transparent, include applying a motion blur to an object such that the object can no longer easily be identified, and/or e.g., a forced pixelation and/or obfuscation of an object in the output image stream such that the object can no longer easily be identified, or similar. In other envisaged embodiments, a privacy mask may include making the objects themselves at least partially transparent in the output image stream, such that the background is visible through the objects. This may be possible if e.g., an image of the background without the object in front is available (from e.g., an input image of the input image stream captured at an earlier time-instance). A marking as envisaged herein may e.g., be any graphical feature which is added to the output image stream which does not mask the object, but which e.g., instead provides additional information about the object (such as a confirmed identity of the object, an identified type of the object, or for example just visually marks where in the output image stream the object is located, by for example adding a rectangle or similar surrounding the object).

The present disclosure also envisages a device for masking or marking an object in an image stream, as will now be described in more detail with references to FIGS. 4A and 4B.

Figure 4A:
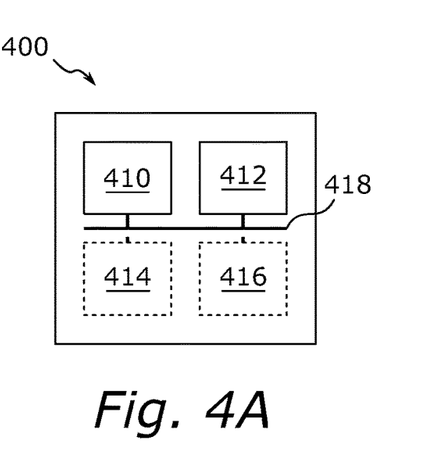

FIG. 4A schematically illustrates an embodiment of a device 400. The device 400 includes at least a processor (or "processing circuitry") 410, and a memory 412. As used herein in the present disclosure, a "processing circuitry" or "processor" may for example be any combination of one or more of a suitable central processing unit (CPU), multiprocessor, microcontroller (µC), digital signal processor (DSP), graphics processing unit (GPU), application specific integrated circuit (ASIC), field-programmable gate-array (FPGA), etc., capable of executing software instructions stored in the memory 412. The memory 412 may be external to the processor 410, or be internal to the processor 410. As used herein in the present disclosure, a memory may e.g., be any combination of random-access memory (RAM) and read only memory (ROM). The memory 412 contains (i.e., stores) instructions that, when executed by the processor 410, causes the device 400 to perform e.g., any of the embodiments of the method 200 disclosed earlier herein. The device 400 may further include one or more additional items 416 which may, in some situations, be necessary for performing the method. In some embodiments, the device 400 may for example be a monitoring camera (which may form part of e.g., a monitoring camera system, and which may be configured to capture an input image stream as discussed herein), and the additional items 416 may then include e.g., an image sensor and for example one/or more lenses (or lens arrangements) for focusing light captured from the scene (towards which the monitoring camera is aimed) on the image sensor in order to capture the input image stream of the scene. The additional items 416 may also include e.g., various other electronics components needed for capturing the scene, e.g., to properly operate the image sensor and/or lenses. This allows for the method to be performed in the monitoring camera itself (i.e., at the "edge"), which may reduce the need for any subsequent processing of the image stream output from the monitoring camera for the purpose of privacy masking, etc. If the device 400 is to be connected to a network (e.g., if the device 400 is a network camera), the device 400 may further include a network interface 414. The network interface 414 may be e.g., a wireless interface supporting e.g., Wi-Fi (as defined in e.g., IEEE 802.11 or subsequent standards, and/or a wired interface supporting e.g., Ethernet (as defined in e.g., IEEE 802.3 or subsequent standards). A communication bus 418 may for example be provided to interconnect the various parts 410, 412, 414, 416 and 418, such that these parts may communicate with each other as required to obtain a desired functionality.

Figure 4B:
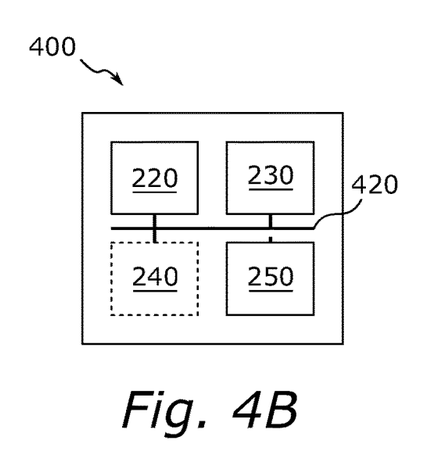

FIG. 4B schematically illustrates an embodiment of the device 400 as described with reference to FIG. 4A, but represented as a collection of functional blocks/modules corresponding e.g., to those discussed with reference to FIG. 2A. The device 400 includes at least the image processing module 220, the object detection module 230, and the feature addition module 250. If object tracking is also used, the device 400 may further include the object tracking module 240. The modules 220, 230, 250 (and optionally 240) are interconnected such that they may communicate with each other as necessary (indicated by the line 420), i.e., such that they may operate to perform the method as envisaged herein and as described e.g., with reference to FIGS. 2A and 2B. One, more or all of the modules 220, 230, 240 and 250 may for example be implemented in software only, in hardware only, and/or as a combination of software and hardware. Such software may for example be provided by the instructions stored in the memory 412. Each module 220, 230, 240 and 250 may be provided as separate entities, or two or more or all of the modules 220, 230, 240, and 250, may be provided as forming part of a same, single entity.

Envisaged herein is also to provide one or more computer programs. One such computer program may for example be for performing the method of masking in an output image stream as discussed herein, for performing such a method in the device 400 described with reference to FIGS. 4A and 4B. A computer program may for example correspond to the instructions stored in the memory 412 of the device 400, such that the corresponding method 200 or any embodiment thereof is performed by the device 400 when the processor (or processing circuitry) 410 executes the instructions. In other envisaged embodiments, the computer programs may be in a form not yet readable by the processor 410, but rather be provided as e.g., text according to a programming language, which text needs to be compiled to a format readable by the processor 410, e.g., by using a therefor suitable compiler. The compiler may of course be executed by the processor 410 itself, or even form part of the processor 410 itself for real-time compilation.

Envisaged herein is also to provide one or more computer program products. Each such computer program product includes a computer readable storage medium on which one or more of the above-mentioned computer programs are stored. For example, one computer program product may include the computer program for performing the envisaged method of masking in an output image stream as disclosed and discussed herein. A (computer-readable) storage medium (e.g., a "memory") may e.g., be any combination of random-access memory (RAM) and read only memory (ROM). In some embodiments, the computer readable storage medium may be transitory (e.g., an electric signal readable by the processor). In other embodiments, the computer readable storage medium may be non-transitory (e.g., in form of a non-volatile memory, such as a hard disk drive (HDD), a solid-state drive (SSD), a secure digital (SD) card or similar, a USB flash drive, or similar such as any combination of magnetic memory, optical memory, solid-state memory, or even remotely mounted memory. Other types of computer readable storage mediums are also envisaged, as long as their functionality allows to store the computer program such that they are readable by the processor and/or by an intermediate compiler.

In summary of the various embodiments presented herein, the present disclosure provides an improved way masking or marking an object in an image stream, in particular in situations where an object detector and/or object tracker may fail to properly indicate and/or track one or more objects due to the objects being e.g., only partially visible within an output image stream generated from an input image stream. The present disclosure is based on the realization that that there may be processing of the input stream for other reasons than the object detection and/or tracking (such as e.g., due to image stabilization, image correction, perspective projections, stitching, or any other transformation described e.g., herein), and that valuable pixel information about the scene may be lost and discarded when pixels are e.g., cropped or masked as part of the processing of the input image stream. In combination with this realization, the present disclosure provides the above advantages over commonly available methods and technology by not just discarding this pixel information about the scene without further thought, but by instead using this pixel information as input for the object detection, thereby reducing the risk of failing to e.g., properly mask or mark an object in an output image stream.

Although features and elements may be described above in particular combinations, each feature or element may be used alone without the other features and elements or in various combinations with or without other features and elements. Additionally, variations to the disclosed embodiments may be understood and effected by the skilled person in practicing the claimed disclosure, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCE NUMERALS 100 conventional method of masking/marking
110, 210 input image stream
112, 212 area of pixels remaining after image processing
113, 213 pixels providing discarded pixel information about a scene
113', 213' pixels providing discarded pixel information about a scene
114, 214 output image stream(s)
120, 220 image processing module
130, 230 object detection module
132, 232 object detection data
133, 233 object detection data
140, 240 object tracking module
142, 242 object tracking data
150, 250 feature addition module
200 improved method of masking/marking
320a, 320b objects
310-314, 314' image processing
321a; 321b object; rectangular background grid
322a scene as depicted
322b, 322c objects
323a object
323b area outside of which pixels are deemed having a lower visual quality
324a-d objects
400 device
410 processor
412 memory
414 network interface
416 additional component(s)
418, 420 communication bus
$I_n^i$, $I_n$ input image
$I'^i_n$, $I'_n$ In intermediate image
$O_n^j$, $O_n$ output image

The invention claimed is:

1. A method of masking or marking on a target object in an image stream, the method comprising:
   receiving a first image frame capturing at least part of a scene in a first input image stream, wherein the first image frame comprises a plurality of pixels;
   identifying, independent of whether any object is depicted or detected in the first image frame, a subset of pixels of the first image frame that, as a result of processing the first image frame to generate an output image stream, will not be included in the output image stream, wherein the subset of pixels of the first image frame is located in a particular peripheral part of a depiction of said at least part of the scene in the first input image stream;
   in response to said identifying and before said subset of pixels of the first image frame is discarded by said processing, using said subset of pixels of the first image frame not-to-be-included in the output image stream for detection of the target object in the particular peripheral part of the depiction of the at least part of the scene in the first input image stream; and
   as part of generating the output image stream and based on said detection of the target object, at least temporarily masking or marking the target object in the output image stream after determining that the target object is at least partially within the output image stream.

2. The method according to claim 1, wherein:
   the depiction of the at least part of the scene in the first input image stream is non-rectangular;
   the subset of pixels of the first image frame comprise pixels lying outside of a rectangular area of said non-rectangular depiction, and
   the non-rectangular depiction results from at least one of:
   a property of a lens arrangement through which the at least part of the scene in the first input image stream is captured, and
   a transformation applied to the first input image stream.

3. The method according to claim 2, wherein the transformation is applied as part of one or more of:
   a lens distortion correction procedure, wherein the lens distortion correction procedure is at least one of a barrel distortion correction, a pincushion distortion correction or a tangential distortion correction;
   synthesizing a birds-eye view of the at least part of the scene in the first input image stream, and
   one or more projections applied to stitch multiple images which captures different parts of the scene in the first input image stream together, and wherein at least one of these multiple images are included as part of the first input image stream.

4. The method according to claim 1, the method being performed in a monitoring camera configured to capture the first input image stream.

5. The method according to claim 1, wherein determining that the target object is at least partially within the output image stream includes using an object tracking algorithm.

6. The method according to claim 1, wherein the subset of pixels of the first image frame in the first input image stream originates from a peripheral area of an image sensor used to capture the first input image stream, and/or from light having arrived at the image sensor via a peripheral section of a lens arrangement, and/or from light having arrived at an angle at the lens arrangement sufficient to cause vignetting.

7. The method according to claim 1, wherein said processing of the first image frame to generate the output image stream includes stitching of the first input image stream with a second input image stream capturing a part of the scene not captured by the first input image stream, and wherein the subset of pixels of the first image frame in the first input image stream originates from an area of the scene also captured by the second input image stream.

8. The method according to claim 1, wherein said processing of the first image frame to generate the output image stream includes applying an electronic image stabilization, EIS, to the first input image stream, and wherein the subset of pixels of the first image frame in the first input image stream comprise pixels being cropped or masked by the EIS.

9. A device for masking or marking a target object in an image stream, the device comprising:
  a processor, and
  a memory storing instructions that, when executed by the processor, cause the device to:
  receive a first image frame capturing at least part of a scene in a first input image stream, wherein the first image frame comprises a plurality of pixels;
  identify, independent of whether any object is depicted or detected in the first image frame, a subset of pixels of the first image frame that, as a result of processing the first image frame to generate an output image stream, will not be included in the output image stream, wherein the subset of pixels of the first image frame is located in a particular peripheral part of a depiction of said at least part of the scene in the first input image stream;
  in response to said identifying and before said subset of pixels of the first image frame is discarded by said processing, use said subset of pixels of the first image frame not-to-be-included in the output image stream for detection of the target object in the particular peripheral part of the depiction of the at least part of the scene in the first input image stream; and
  as part of said generating the output image stream and based on said detection of the target object, at least temporarily mask or mark the target object in the output stream after determining that the target object is at least partially within the output image stream.

10. The device according to claim 9, wherein the device is a monitoring camera configured to capture the first input image stream.

11. The device according to claim 9, wherein the instructions are further such that they, when executed by the processor, cause the device to perform a method, wherein the subset of pixels of the first image frame in the first input image stream originates from a peripheral area of an image sensor used to capture the first input image stream, and/or from light having arrived at the image sensor via a peripheral section of a lens arrangement, and/or from light having arrived at an angle at the lens arrangement sufficient to cause vignetting.

12. The device according to claim 11, wherein the device is a monitoring camera configured to capture the first input image stream.

13. A non-transitory computer-readable medium storing a computer program for masking or marking a target object in an image stream, configured to, when executed by a processor of a device, cause the device to:
  receive a first image frame capturing at least part of a scene in a first input image stream, wherein the first image frame comprises a plurality of pixels;
  identify, independent of whether any object is depicted or detected in the first image frame, a subset of pixels of the first image frame that, as a result of processing the first image frame to generate an output image stream, will not be included in the output image stream, wherein the subset of pixels of the first image frame is located in a particular peripheral part of a depiction of said at least part of the scene in the first input image stream;
  in response to said identifying and before said subset of pixels of the first image frame is discarded by said processing, use said subset of pixels of the first image frame not-to-be-included in the output image stream for detection of the target object in the particular peripheral part of the depiction of the at least part of the scene in the first input image stream; and
  as part of said generating the output image stream and based on said detection of the target object, at least temporarily mask or mark the target object in the output image stream after determining that the target object is at least partially within the output image stream.

14. The non-transitory computer-readable medium according to claim 13, further configured to cause the device to perform a method, wherein the subset of pixels of the first image frame in the first input image stream originates from a peripheral area of an image sensor used to capture the first input image stream, and/or from light having arrived at the image sensor via a peripheral section of a lens arrangement, and/or from light having arrived at an angle at the lens arrangement sufficient to cause vignetting.

* * * * *